April 16, 1935.  F. J. LAPOINTE  1,998,162

ROTARY BROACHING MACHINE

Filed Feb. 16, 1934  4 Sheets-Sheet 1

Inventor
Francis J. Lapointe
By
Attorney

April 16, 1935.  F. J. LAPOINTE  1,998,162
ROTARY BROACHING MACHINE
Filed Feb. 16, 1934  4 Sheets-Sheet 2

Inventor
Francis J. Lapointe
By Faust F. Crampton
Attorney

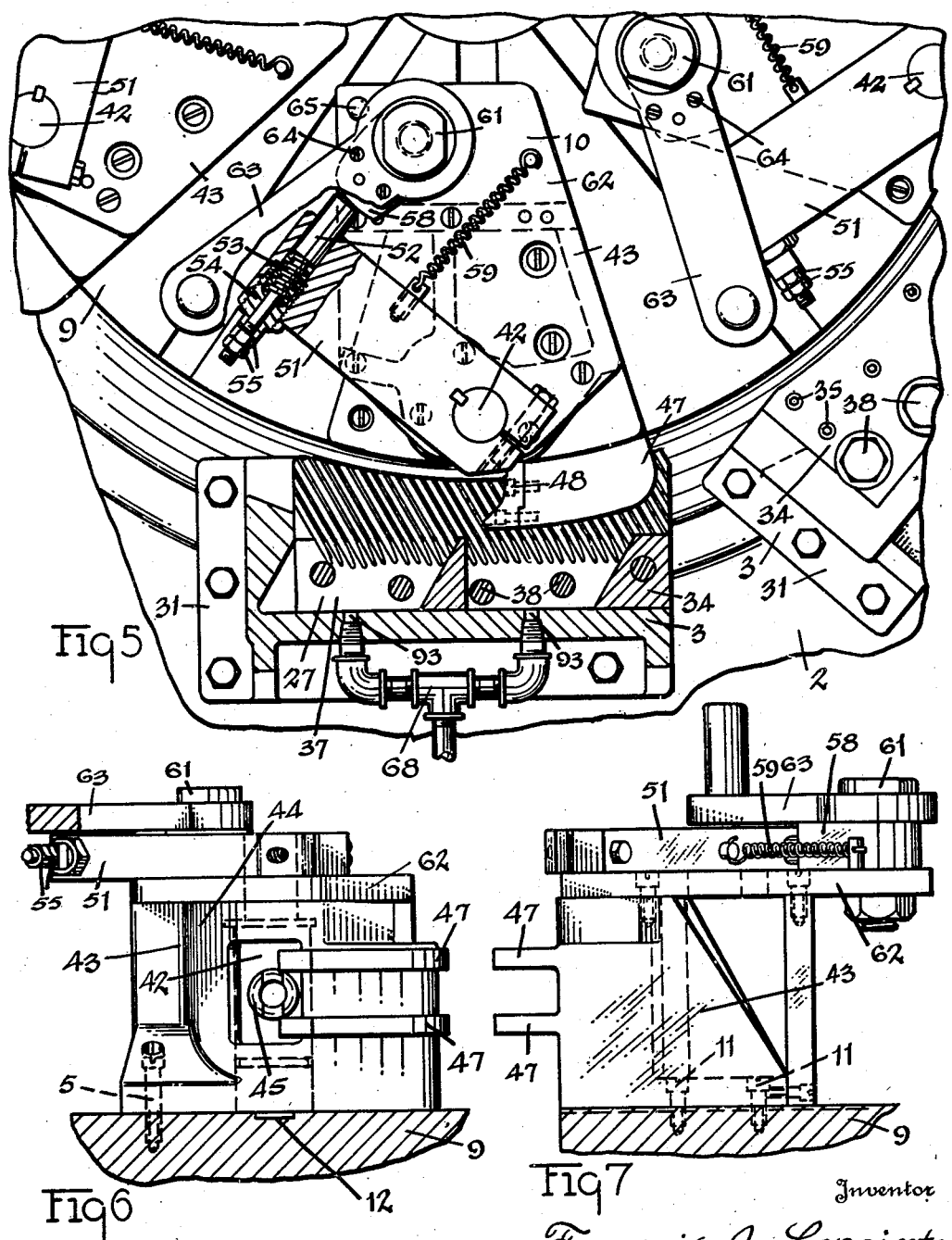

Inventor
Francis J. Lapointe
By Faust F. Crampton
Attorney

Patented Apr. 16, 1935

1,998,162

UNITED STATES PATENT OFFICE 1,998,162

ROTARY BROACHING MACHINE

Francis J. Lapointe, Ann Arbor, Mich.

Application February 16, 1934, Serial No. 711,467

7 Claims. (Cl. 90—33)

My invention has for its object to provide a rotary machine whereby surfaces of metal objects may be formed and finished to desired dimensions. The machine is so constructed that provision may be made for broach cutting one or more surfaces of the object at the same time. Thus, slots or grooves or corrugations or curved or angularly disposed surfaces may be formed in objects or forked objects or yoke shaped objects that are to have parallel finished surfaces, or finished surfaces at any desired angle to other finished surfaces may be formed and finished to desired dimensions.

The invention also provides a machine wherein the broach cutting is continuously performed and thus eliminates reciprocatory movements of the machine having working and return strokes.

The invention provides means for mounting the articles in suitable work holding parts that may be readily operated for the placement and removal of the articles, which, in conjunction with the continuous rotary movement of the machine, enables broach cutting articles to form finished surfaces at a relatively rapid rate of the desired shape.

The invention also provides broaches particularly adapted to rotary surface cutting and finishing to produce desired results dependent either upon the particular shape of the article or upon the metal of which the article is formed.

The invention may be contained in metal cutting machines of different forms, and to illustrate a practical application of the invention, I have selected a rotary broach machine as an example of the vrious structures that may embody my invention, it being understood that variations may be made in the details of the construction and certain features of the structure may be omitted and the structure may still contain the substance of the invention as set forth in the claims hereinafter. The particular structure selected as an example is shown in the accompanying drawings and is described hereinafter.

Figure 1:
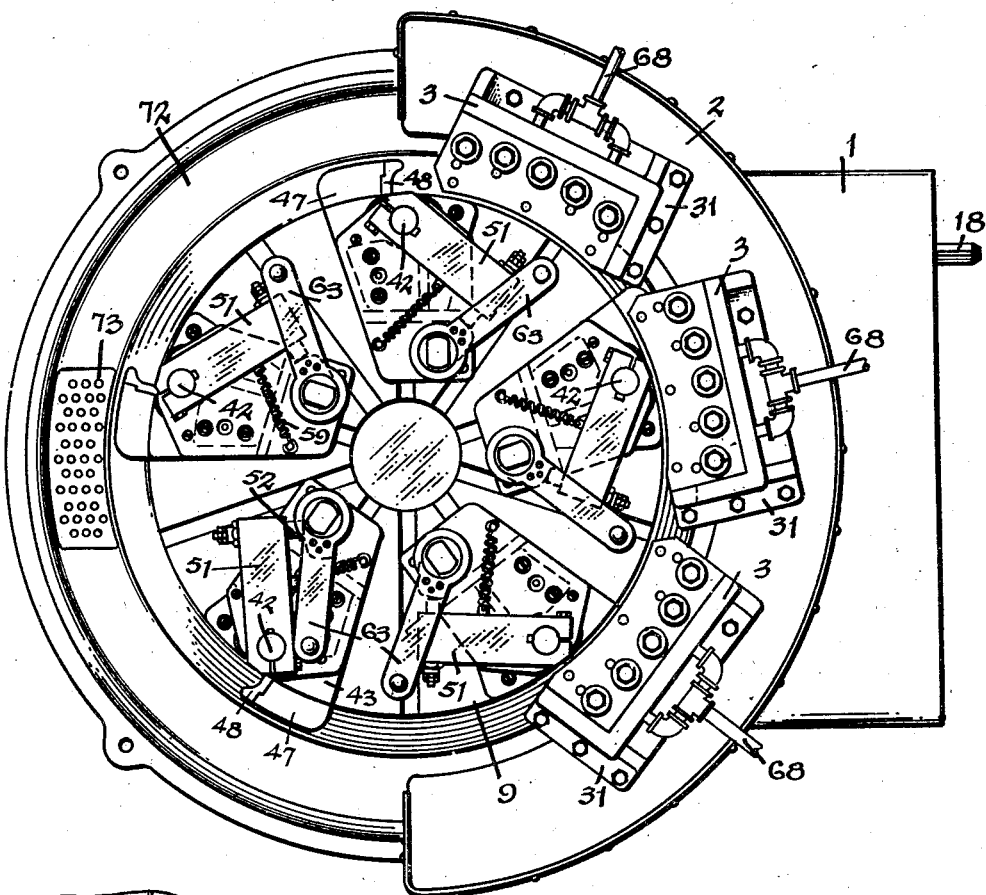
Figure 2:
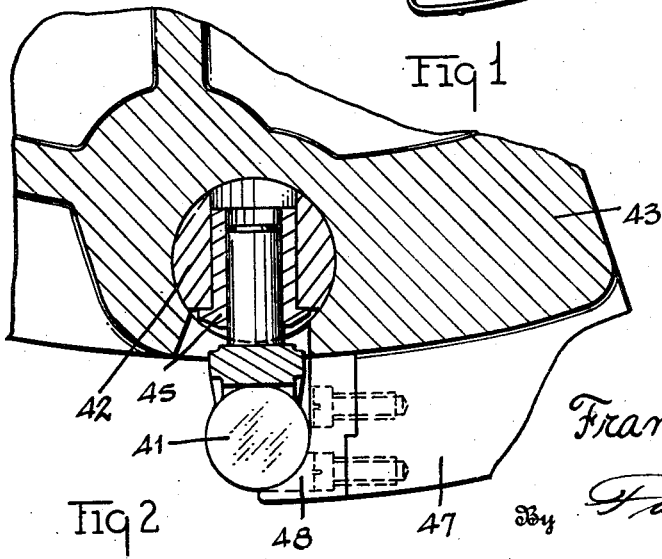
Figure 3:
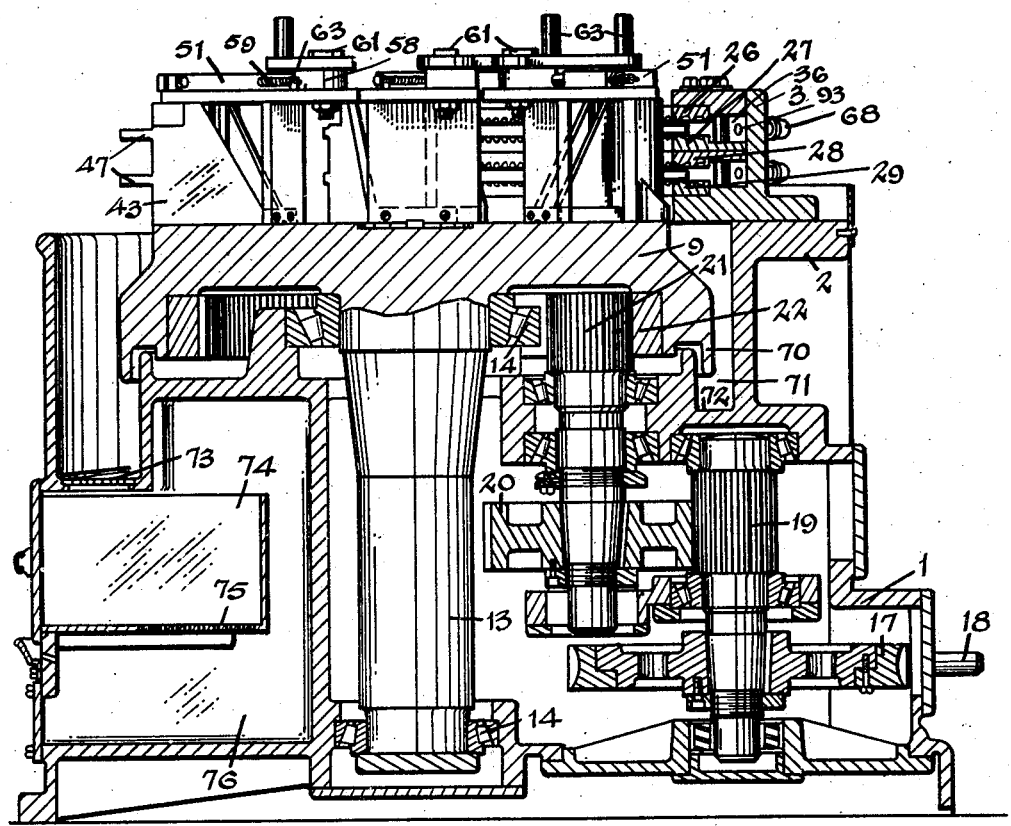
Figure 4:
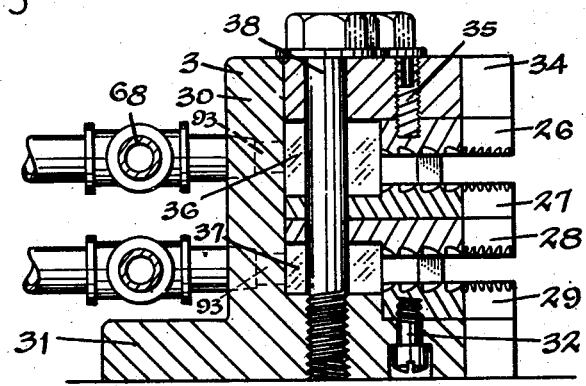
Figure 8:
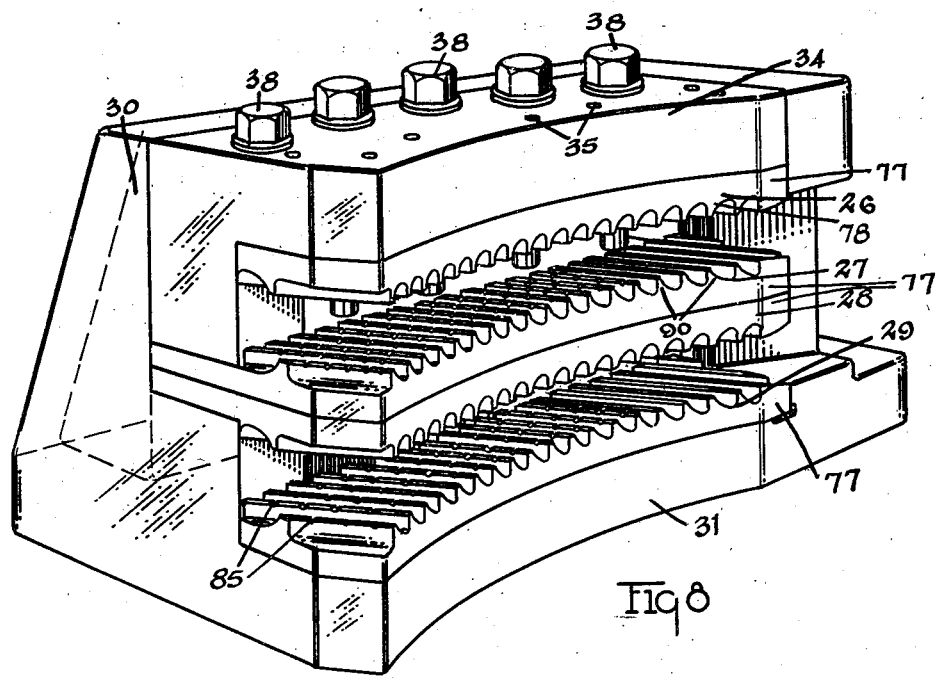
Figure 9:
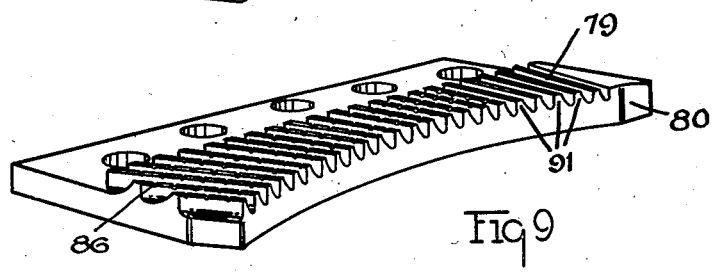
Figure 10:
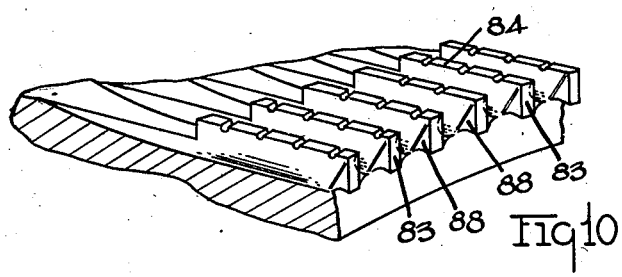

Fig. 1 illustrates a top view of the rotary broaching machine selected as an example. Fig. 2 illustrates a section of a broaching block illustrated in Fig. 1 and also illustrates the position of the work in the broaching block. Fig. 3 illustrates a vertical section of the machine illustrated in Fig. 1. Fig. 4 illustrates a broach block in which a plurality of broach plates are mounted. Fig. 5 illustrates an enlarged view of a part of the machine, one of the broach blocks being shown in section. Fig. 6 illustrates an end view of the broach block. Fig. 7 illustrates a side view of the broach block. Fig. 8 illustrates a perspective view of a broach block, the broach plates shown in said figure having parallel teeth. Fig. 9 illustrates a broach plate whose teeth are located at the same angle to the radial lines extending through the centers of the teeth. Fig. 10 illustrates a broach plate having teeth, the cutting edge of each tooth having parts extending at an angle to the other part.

The broaching machine illustrated in the drawings is provided with a shell 1 having suitable chambered parts for a power transmission mechanism and for collection of chips and containing a circulated lubricant. The broaching machine is provided with a ledge 2 on which are supported broach blocks 3 and to which the blocks are secured by means of suitable bolts 5 to maintain the broach blocks securely in position. Within the shell 1 is located a rotary table 9 on which are mounted work holders 10. The work holders are secured in position by means of suitable screws 11 and ridges and slots 12. The ridges and slots 12 extend radially to enable adjustment of the work holders with reference to the edge of the table.

The rotary bed or table 9 has a spindle 13 suitably mounted in bearings 14 and is thus rotatably supported by the frame or shell 1. The table 9 is driven by means of a worm wheel 17 to which is connected the source of power by means of a suitable shaft 18. The worm wheel is located on a shaft having the pinion 19 that drives the gear wheel 20 which is located on the shaft having the pinion 21 that meshes with an internal ring gear 22 secured to a suitable depending flange formed at the periphery of the rotatable table 9. The mechanism thus operates to rotate the work holders 10 clockwise relative to the broach blocks 3.

The work holders 10 are provided with means for readily securing the work in position so that the parts of the work will be engaged by the broach plates of the broach blocks and will be progressively cut and finished as the work is moved over the broach plates in succession upon movement of the rotary table. The broach plates are formed to have broach cutting teeth of the cross-sectional shape commonly used in connection with broaches, that is, teeth having suitable tool clearance and chip clearance to enable the discharge of the chips. Also, the broach teeth may be provided with notches or recesses for shortening the chips or, as it is sometimes termed, for breaking the chips to enable ready discharge of the chips.

Thus, the broach plates 26, 27, 28, and 29 may be secured in the block 3 which is shaped to permit the desired positioning of the broach plates. The broach block 3 is provided with an L-shaped member 30 having a base part 31, and the plate 29 is secured by means of a screw 32 to the base part 31. The block also has a clamping member 24 to which the plate 26 is secured by means of the screws 35. The L-shaped member 30 and the clamp 34 are provided with spacing lugs 36 and 37. Screws 38 extend through the clamping member 34 and are threaded into the base part 31 of the member 30. The plates 27 and 28 are located back to back and between the spacing lugs 36 and 37, and when the screws 38 are threaded into the base part 31 of the block, the plates 27 and 28 are securely clamped in position relative to the plates 26 and 29. When the block is located in position on the ledge 2 of the frame or shell 1 of the machine, and the work is secured in the work holders and moved relative to the broach blocks, the work will be cut by the broach plates so as to broach cut and finish the side surfaces of a pair of ears on the end of a rod such as is commonly found in piston rods.

The work holders may be formed according to the shape of the work to best hold it in position to be engaged and operated on by the broach plates. In the form shown, the work 41 is located in a spindle 42 rotatably supported in the frame 43 of the work holder. The spindle 42 is placed in an enlarged portion 44 of the frame 43, the said portion being bored to receive the spindle 42 to rotatably support it in position when the work holder 10 is placed upon and secured to the turn table 9. The spindle 42 has an opening in which may be located a bushing 45 shaped to receive the shank of the particular work which has been selected as illustrative of the operation of the apparatus.

The work holder 10 is provided with protruding flanges 47 that are so disposed that they may move freely between the plates 26 and 27 in one case, and the plates 28 and 29 in the other case. The leading ends of the flanges 47 are provided with jaws 48 that may be secured to the flanges by suitable bolts. The jaws 48 are shaped according to the surface of the work that is engaged thereby and are preferably shaped to form an inclined surface such that, by pressure against the jaws 48, the work will be held in the bushing 45. Thus, the pressure of the cutting operation of the work operates to hold the work in position relative to the work holder and the broach plates.

The work is yieldingly held against the jaws 48 by means of a spring pressed arm 51 that is keyed to the spindle 42. The arm 51 has a pin 52 located in a socket. The pin 52 is spring pressed by means of a spring 53 located between the shoulder formed on the pin 52 and a threaded plug 54 that closes one end of the socket. The outward movement of the pin 52 may be limited by a pair of nuts 55 threaded on to one end of the pin. The spring 53 operates to press the pin 52 against a cam 58, the arm 51 being drawn towards the cam by means of a spring 59 which is connected to the arm 51 and to the top plate 62 of the work holder 10. The cam 58 is rotatably supported on the plate 62 by means of the pin 61 which is threaded into the plate 62. The cam is rotatably operated by means of the crank 63 to which it may be connected by suitable screws 64. When the crank 63 is rotated counter-clockwise from the position shown in Fig. 5, the cam 58 moves beneath the pin 52 and allows the pin 52 to approach more closely the axis of rotation of the cam 58 under the pressure of the spring 59. Upon reverse rotation of the crank 63, the arm 51 is moved outward, the movement of the cam and arm being limited by a suitable stop pin 65. The outward movement of the arm 51 rotates the spindle 42 and places the projecting part of the work against the surfaces of the jaws 48, the pin 52 operating through its spring 53 to yieldingly press the projecting portions of the work against the jaw 48 and enable yielding movements of the work relative to the broach blocks as the cutting pressure varies during the movement of the table.

Any number of broach blocks may be used. Preferably, a larger number of work holders are mounted on the rotary table 9 than there are broach blocks mounted on the ledge 2. The ledge 2 extends substantially semi-circularly, leaving semi-circular spaces above the machine for manipulation of the work holders to place the work within and remove it from the work holders in succession as they pass the operator of the machine.

In order to remove the chips and maintain the broaching plates clean, a stream of suitable lubricating and cooling fluid may be directed through the pipes 68, by a suitable pump which will operate to wash the chips inward toward the table 9. The chips work their way down over the apron 70 of the work or rotary table and into a recess 71 having a suitable sloping bottom 72 that carries the chips downwardly as they are washed to the forward part of the shell 1 of the broaching machine where the lubricating fluid is allowed to pass through a suitable strainer 73 and into a box 74. If desired, the strainer 73 may be opened to allow the larger chips to fall into the box 74. The box 74 is also provided with a strainer 75 having smaller openings than the strainer 73, which permits the lubricating fluid to pass into the container 76 that constitutes a source of supply from which the fluid may be pumped by a suitable pump and directed to the pipes 68 and through the nozzles 93 to thus circuitously move through the machine. The box 74 may be in the form of a drawer for its ready removal and dumping of the chips.

The broach plates may be varied in shape to conform to the shape into which the work is to be cut and finished. Their outer edges are circular and conform to the contour of the edge of the table, to which the inner edges of the broach blocks also conform. As the teeth 78 of the plates 26, 27, 28, and 29 are worn and resharpened, the plates having the sharpened teeth will be reduced in their length, that is, their cutting edges will be positioned nearer to the back surfaces of the plates by the grinding operation, and consequently the distance between the teeth of oppositely disposed plates will be located slightly more remote. Hence, it may be found desirable to move the plates thus sharpened to one of the more advanced broach blocks, the finishing being done by the plates of the following block of the set. As the work is moved over the teeth, it is progressively cut, the teeth being so ground as to locate their edges in relatively sloping surfaces. The body of the plate at one end 77 may be formed slightly thicker than the other end in order to locate the cutting edges in surfaces that slope relative to the back surfaces of the plates in order that the teeth in succession will produce the same depth of cut in the material and thus distribute the cutting load in the teeth.

In the form of the broaching plate shown in Fig. 8, the more central broaching teeth have their edges located substantially 30° to the radial line and the remaining teeth are parallel thereto, thus causing each tooth edge to engage more nearly at right angles to the movement of the work when first engaged by the teeth of the plate, and as the work is swept over the plate, the angle of succeeding teeth diminishes so that the work is moved in a direction that is less and less abrupt to the cutting edge of the teeth, and, therefore, the finishing cut of each tooth at the following end of each of the plates produces by reason of its inclination to the direction of the movement of the work, a more gradual cut. Consequently, by this arrangement of the teeth, a better finish will be produced on the work than would be if the abrupt or substantially right angular cut was produced at the following end of the plate. Thus, each plate finishes the surface of the work to a very fine glaze.

If desired, the plates, as shown in Fig. 9, may have each tooth 79 located so as to form an angle of 10° to the radius of the center of the tooth. Thus, the teeth 79 of the plate 80 will engage in succession the work at the same angle as it is moved over the length of the plate. Here the teeth are located 10° to the radial line extending to the center of the edge of the teeth, which operates to place the same cutting load on the teeth as the work is swept over the plate. Also, as in the case of the broach plates 26, 27, 28, and 29, the body of the plate at the following end may be slightly thicker or the teeth 79 may project slightly more at the following end than at the leading end of the plate to locate the edges of the plate in a sloping surface to cause the same cutting load on all of the teeth.

The advance teeth may be provided with the notches in either form of the plates, such as at 85 in the plates 26, 27, 28, and 29, and at 86 in the plate 80, to break up the chips. Preferably, the notches are omitted from the last two or three of the following teeth 90 in the plates 26, 27, 28, and 29, and in the teeth 91 in the plate 80. They constitute finishing teeth and have, relative to the backs of the plate, the same elevation, while those having the chip breaking notches may be located in a surface that slopes relative to the back sides of the plates.

As shown in Fig. 10, the plates, such as the plates shown in Figs. 8 and 9, may be provided with teeth having the parts 83 that extend at right angles to the teeth 84, that is, the cutting edges of the parts 83 will constitute substantially a right angle continuation of the cutting edges of the teeth 84. The usual rake of each part 83 of the tooth edge may be made by grinding back the triangular portion 88 to form a surface slightly inclined inward with respect to the outer or top surface of this part of the tooth, the top having also the usual tooth clearance.

I claim:

1. In a broaching machine having parts located in proximity to each other, means for moving one part relative to the other, a work holder comprising a work engaging member, a yielding means tending normally to draw the work from the work engaging member, and a resilient means for holding the work in position against the work engaging member counter the yielding means, and means for engaging the resilient means to move and hold the work against the engaging member by the pressure of the resilient means less that of the yielding means, and a broach cutting member secured to the other of said parts.

2. In a broaching machine, having parts located in proximity to each other, one of the said parts rotatable relative to the other, and means for rotating the said rotatable part, means for securing the work to one of the said parts, and a broach plate secured to the other of the said parts and having a plurality of teeth, the edges of the teeth located in a common plane and extending parallel to each other and at an angle to the radial lines from the axis of rotation of the rotatable part to the centers of the said edges.

3. In a rotary broaching machine, a table, means for rotating the table, a frame surrounding the table, a broach block secured to the frame, a broach plate having a plurality of parallel teeth having edges located substantially in a plane at right angles to the axis of the rotation of the table and inclined to the radial lines extending from the center of rotation of the table to the center of the edges of the teeth and secured in the broach block, and a work holder secured to the table, the work holder having a work engaging jaw and a resilient means for holding the work against the jaw and in cutting relation to the teeth of the plate.

4. In a rotary broaching machine, a rotatable member, a work holder supported on the rotatable member, a stationary table surrounding the rotary member and having a plurality of broaching plates, the work holder having a rotatable part for receiving the work and a work holder rest for engaging the work, the edges of the teeth of each plate located inclined to the radii passing through the center of the edges of the teeth and the axis of rotation of the rotatable member and located in a common plane and operable to force the work against the said work holder part and against the work holder rest as the work is moved over the teeth.

5. In a rotary broaching machine, a rotatable member, a work holder supported on the rotatable member, a stationary table surrounding the rotary member and having a plurality of broaching plates, the work holder having a rotatable part for receiving the work and a work holder rest for engaging the work, the edges of the teeth of each plate located in parallel relation to each other and inclined to the radii passing through the center of the edges of the teeth and the axis of rotation of the rotatable member and located in a common plane and operable to force the work against the said work holder part and against the work holder rest as the work is moved over the teeth, a resilient means and manual means for moving the work against the rest by the pressure of the resilient means.

6. In a rotary broaching machine, a rotatable member, a work holder supported on the rotatable member, a stationary table surrounding the rotary member and having a plurality of broaching plates, the work holder having a rotatable part for receiving the work and a work holder rest for engaging the work, the edges of the teeth of each plate located inclined to the radii passing through the center of the edges of the teeth and the axis of rotation of the rotatable member and operable to force the work against the said work holder part and against the work holder rest as the work is moved over the teeth, a resilient means for moving the work holder to move the work from the work holder rest, a cam for rotating the work holder counter to the said resilient means, and a spring located intermediate the said cam and the said work holder for increasing the pressure of the work against the rest.

7. In a rotary broaching machine, a rotatable member, a work holder supported on the rotatable member, a stationary table surrounding the rotary member and having a plurality of broaching plates, the work holder having rotatable parts for receiving the work and a work holder rest for engaging the work, the edges of the teeth of each plate located in parallel relation to each other and inclined to the radii passing through the center of the edges of the teeth and the axis of rotation of the rotatable member and operable to force the work against the work holder and against the work holder rest as the work is moved over the teeth, a resilient means for moving the work holder to move the work from the work holder rest, a cam for rotating the work holder counter to the said resilient means, a spring located intermediate the said cam and the said work holder for increasing the pressure of the work against the rest, a source of supply of lubricant cooling liquid under pressure, nozzles for projecting the cooling liquid inwardly from the outer ends of the edges of the teeth and in a direction counter to the movement of the chips in which they form by the inclined relationship of the cutting edges of the teeth to the radii extending from the center of the rotatable member.

FRANCIS J. LAPOINTE.